(12) United States Patent
Gulliford et al.

(10) Patent No.: US 6,366,584 B1
(45) Date of Patent: Apr. 2, 2002

(54) COMMERCIAL NETWORK BASED ON POINT TO POINT RADIOS

(75) Inventors: Philip C. Gulliford; Brian J. Andrew, both of Longwood, FL (US)

(73) Assignee: Triton Network Systems, Inc., Orlando, FL (US)

( * ) Notice: Subject to any disclaimer, the term of this patent is extended or adjusted under 35 U.S.C. 154(b) by 0 days.

(21) Appl. No.: 09/245,701

(22) Filed: Feb. 6, 1999

(51) Int. Cl.[7] .......................... H04L 12/28; H04L 12/56
(52) U.S. Cl. ...................................... 370/403; 370/258
(58) Field of Search ................................. 370/403, 256, 370/257, 258, 270, 277, 278, 279, 280, 282, 293, 294, 327, 328, 329, 336, 337, 338, 340, 341, 345, 359, 360, 396, 400, 401, 404, 405, 406, 419, 420, 421

(56) References Cited

U.S. PATENT DOCUMENTS

| | | | |
|---|---|---|---|
| 5,355,362 A | | 10/1994 | Gorshe et al. ............. 370/16.1 |
| 5,371,734 A | | 12/1994 | Fischer ........................ 370/18 |
| 5,515,367 A | | 5/1996 | Cox, Jr. et al. ............ 370/60.1 |
| 5,533,027 A | * | 7/1996 | Akerberg et al. ........... 370/347 |
| 5,559,795 A | | 9/1996 | Ahl ............................. 370/60 |
| 5,592,470 A | * | 1/1997 | Rudrapatna et al. ........ 370/320 |
| 5,640,384 A | | 6/1997 | Du ............................. 370/221 |
| 5,657,142 A | * | 8/1997 | Fahim ......................... 359/110 |
| 5,661,723 A | | 8/1997 | Ueno et al. ................. 370/315 |
| 5,710,756 A | | 1/1998 | Pasternak et al. ........... 370/216 |
| 5,751,454 A | | 5/1998 | MacDonald et al. ........ 359/119 |
| 5,761,534 A | | 6/1998 | Lundberg et al. ........... 395/870 |
| 5,854,793 A | * | 12/1998 | Dinkins ....................... 370/503 |
| 5,867,485 A | * | 2/1999 | Chambers et al. .......... 370/281 |
| 5,909,175 A | | 6/1999 | Yamasaki et al. ........... 340/506 |
| 5,936,949 A | | 8/1999 | Pasternak et al. ........... 370/328 |
| 6,016,313 A | * | 1/2000 | Foster, Jr. et al. .......... 370/330 |
| 6,058,307 A | * | 5/2000 | Garner ....................... 455/428 |
| 6,122,759 A | * | 9/2000 | Ayanoglu et al. ............ 714/57 |
| 6,169,735 B1 | * | 1/2001 | Allen, Jr. et al. ........... 370/352 |

FOREIGN PATENT DOCUMENTS

EP 0488824 6/1992 ............ H04B/7/24

OTHER PUBLICATIONS

"STN 155–H Radio–Relay System for the Synchronous Digital Hierarchy" by Armand Collin and Pierre Butell, Phillips Telecommunication Review, vol. 51, No. 2, pp. 18–26, Aug. 1, 1993.

(List continued on next page.)

Primary Examiner—Dang Ton
Assistant Examiner—Phirin Sam
(74) Attorney, Agent, or Firm—Fulbright & Jaworski L.L.P.

(57) ABSTRACT

The present invention is a wireless network designed to deliver information communication services, such as telephony and data services, from a service provider, such as an ISP or LEC to metropolitan commercial customer locations. The network of a preferred embodiment of the present invention incorporates all system components necessary to connect customers, application equipment (e.g., phones, PBX's, computers) to the service provider's equipment, (e.g., C.O. switch, Tandem switch, point of presence (POP) gateway, ISP server, etc.). The preferred embodiment of the present invention integrates all the various functional tasks at the component level, to build a comprehensive, cohesive network solution. The network architecture of the present invention includes a distributed set of non-hierarchal nodes, connected together via wireless links. Nodes of the network can act both as termination points (i.e., connecting to the customer's or service provider's equipment) and/or as tandems, (i.e., routing traffic on to other nodes). Links between nodes can be point-to-point or point-to-multipoint.

23 Claims, 2 Drawing Sheets

OTHER PUBLICATIONS

"Technical and Economic Assessment on Radio Relay Systems in the Local and Distribution Italian Networks" by A. Del Pistoia et al., European Conference on Radio Relay Systems, GB, London, IEEE, Conference Publication No. 386, pp. 84–89 Oct.

"What's Next for Wireless", by Eric C. Zimits, Internet, Online!, vol. 1, Issue 1, pp. 1–4, Dec. 1998.

"Wireless Net Offers Low Cost, Reliability", by Stephanie La Polla, PC Week Online, Jun. 9, 1997.

PCT Invitation to Pay Additional Fees dated Aug. 16, 2000.

\* cited by examiner

COMMERCIAL NETWORK BASED ON POINT TO POINT RADIOS

REFERENCE TO RELATED APPLICATIONS

Reference is also made to the following co-pending and commonly assigned U. S. Patent Application entitled SYSTEM AND METHOD OF CONTROLLING CO-CHANNEL INTERFERENCE IN POINT TO POINT COMMUNICATIONS, Ser. No. 09/162,967, filed Sep. 29. 1998, the disclosure of which is incorporated herein by reference. Reference is also made to the following co-pending and commonly assigned U.S. Pat. Application entitled SYSTEM AND METHOD FOR ESTABLISHING A POINT TO POINT RADIO SYSTEM, Ser. No. 09/140, 295, filed Aug. 25, 1998 the disclosure of which is incorporated herein by reference The present application is being concurrently filed with commonly assigned U.S. patent application, Ser. No. entitled "METHOD AND APPARATUS FOR RADIO INSTALLATION AND ALIGNMENT", Ser. No. entitled "SELF BALANCING BRACKET FOR RADIO TRANSCEIVER", and Ser. No. entitled "APPARATUS AND METHOD FOR LOCAL RADIO MANAGEMENT AND CONTROL USING AUTOMATED CUSTOMER INTERFACE", the disclosures of which are incorporated herein by reference.

TECHNICAL FIELD

This invention relates to a wireless metropolitan area information communication system, and more particularly to an information communication network utilizing a plurality of high bandwidth wireless links.

BACKGROUND

Network communications, such as telephony networks and information system networks including those used in the Internet, are typically implemented using land-based communications technologies, which generally use either copper wire or optical fiber. Optical fiber is becoming increasingly popular because of its much higher bandwidth. Due to the physical constraints of fiber optic technology, optical transmissions are typically point-to-point. In this method, each network node (which can be a computer system with communications links to one or more other nodes) transmits to only one node at a time. In some networks, such as Ethernet networks, when the receiving node receives data it examines the destination address in the received data and determines if it is the addressee. If it is, the receiving node keeps and processes that data. If it is not, it retransmits the data to another node which does the same. In other network, this routing may be accomplished by other techniques. For example, time division techniques, such as used in SONET, may be relied upon where information in a particular time slot of a frame is directed to one piece of termination equipment and may be identified and processed accordingly. However, information in a different time slot may be retransmitted to another node. In this manner, the data will eventually reach its destination and be processed. If the network has a linear or ring configuration, each node has only one choice of which node to forward the message to. But if each node has connections to multiple other nodes, each node may contain a routing directory or other aid to help it choose which node to which to forward the message. By judiciously choosing which link to use, each node can help to efficiently route the message to its destination through a complex network with a large number of possible routes.

It is also possible for two systems, telephony, computer, or otherwise, to communicate with each other through radio links, such as through point-to-point radio links using directional microwave antennas. Due to the previous cost of microwave radio technology and licensing constraints, this approach has largely been limited to high capacity dedicated communications between two points rather than common network communications in which traffic is routed through a system of many nodes. With the total cost of the technology dropping, it is becoming economically feasible to implement network links with radio. However, most of the installed systems in these networks use either copper wire or fiberoptic interfaces and, therefore, utilize communications protocols adapted for such media and are not directly compatible with current microwave networks. Moreover, the current point to point systems are not adapted to provide functionality necessary in networking installations, such as the aforementioned routing of information, and therefore do not lend themselves easily to installation as a network element.

SUMMARY OF THE INVENTION

In recent years, the FCC has striven to increase competition for local telephone access. At the same time, telecommunications customers' service requirements have dramatically expanded especially in the area of data networking. New government deregulation has allowed for competitive service providers to enter the marketplace. The present invention is well suited to assist a CLEC (Competitive Local Exchange Carrier), for example, to achieve their service delivery network goals. Beside the increasing need for telephony services, customers have placed increasing demands on data communication infrastructures such as Internet Service Providers (ISP), for reliable data communication, such as wide area networking (WAN), local area networking (LAN), and Internet services. The present invention is also well suited for providing high bandwidth data communication and therefore may be utilized to assist an ISP to achieve their delivery goal.

Both CLECs and ISPs may use the present invention, the preferred embodiment of which is a wireless networks based on 38 GHz microwave technology, for, inter alia, the following reasons: 1) high bandwidth, 2) rapid deployment, and 3) incremental deployment costs.

1) The 38 GHz band as partitioned by the FCC includes 14 channels of 100 MHZ each. Such channels are capable of supporting potentially hundreds of Megabits per second, in contrast to cellular channels which may support a few tens of kilobits per second or T1 lines which support 1.544 Mbps. Thus the use of the 38 GHz frequency bands should provide the much greater subscriber and traffic capacities required by telephony networks or data networks. Of course, spectrum divisions other than those of the 38 GHZ band may be utilized according to the present invention where they may provide sufficient bandwidth to achieve the goals of the present invention.

2) Wireless networks adapted according to the present invention can be deployed in a fraction of the time it takes to deploy in-ground based (copper, fiber, hybrid fiber/coaxial HFC, etc.) systems due to the inherently time consuming processes (permitting, right-of-way resolution, digging etc.) associated with placing cable media in the ground.

3) In addition to rapid to deployment, microwave based service networks of the preferred embodiment of the present invention do not require a massive initial capital investment before any subscribers can get service, which is the case for networks using wire based technologies. The microwave network systems of the preferred embodiment can be built out incrementally, thereby conserving capital while immediately generating revenue.

The preferred embodiment of the present invention further takes advantage of the flexibility afforded by the 38 GHz frequency band licenses granted by the FCC on an area basis, as opposed to other microwave licenses such as in the 23 GHz band, which are allocated as an individual license per point-to-point link. Accordingly, a network coverage plan may be established to provide information communication throughout a metropolitan area utilizing radio links of the present invention, such as shown and described in the above referenced patent application entitled "System and Method for Establishing a Point to Point Radio System", the disclosure of which is incorporated herein by reference. Thus the 38 GHz frequency band, or similarly regulated frequency bands of radio spectrum, license holders may deploy microwave links at will in their designated service areas nationwide.

Another object of the invention is to provide services at lower entry and deployment costs without the traditional hard-wired network costs associated with cables and trenching.

Another object of the invention is to provide systems that may be deployed rapidly with minimal disruption to the community and the environment.

Another object of the invention is to provide a scaleable architecture incorporating open industry standards which ensures that services and coverage areas can be easily modified and expanded as customer demand warrants.

Another object of the invention is to achieve lower network maintenance, management, and operating costs. Lower ongoing costs are possible given the flexible design options, advanced services, and reduced equipment requirements.

An object of the invention is to provide high speed Internet or other data communication network access. Current Internet access speeds using dial up modem technology or even basic rate ISDN (Integrated Services Digital Network) are inadequate for most commercial users. Alternatives such as DSL (Digital Subscriber Line or Loop) have yet to be deployed in any significant density, while dedicated facilities (leased T1) or Frame Relay service from the (Incumbent Local Exchange Carrier) ILEC (if available) are still prohibitively expensive. The demand is expected to continue to increase as more and more organizations migrate a significant portion of their business transactions onto the Internet and/or other wide area or global data communication network. What is needed is a network that can be deployed quickly that provides high speed connections ranging in the hundreds of Mbps.

Another object of the present invention is to provide for the transport and routing of IP based data communications across a wireless network including TCP, UDP and FTP other protocols.

Another object of the invention is to provide Internet access to end users at user system native speeds and beyond, such as 100 Mbps Ethernet and even Gigabit Ethernet speeds, to provide a network which is seamless and invisible from the user's vantage point. The data services provided are orientated to work with existing customer equipment (e.g., LANs, WANs and telephony devices) and networking configuration. Data services include LAN transport, Internet access, and virtual private networking.

According to an aspect of a preferred embodiment of the invention, a microwave data network provides high power MMIC's, integrated antennas, SONET OC-3 and/or Fast Ethernet modems and direct SONET OC-3 and Fast Ethernet fiber interfaces.

According to another aspect of a preferred embodiment of the invention, a microwave data network provides an intelligent Ethernet switching network that transports Ethernet packets between computer networks at different locations using a microwave ring or other topology network. A switch located in the microwave transmitter or receiver unit determines the destination of the packets based on the Ethernet packet address.

According to one aspect of a preferred embodiment of the invention, a network architecture includes distributed processing capability, such as may be provided by Java, C++, or like languages, to provide both the operator and customer with up to the minute information about system and service performance. According to a feature of the invention, new services and capabilities can be rapidly added and downloaded to the network equipment without disruption to the network or the customer. Thus service problems are identified at the outset, while the customer gets "real time" feedback on the quality of service obtained plus the opportunity to access and test drive new features, etc.

According to an aspect of a preferred embodiment of the invention, the microwave data network also provides in band management capabilities to address radios by a logical or physical address, such as a MAC address, or an Internet Protocol address. According to another aspect of a preferred embodiment of the invention, the microwave data network provides a system where individual elements of the network have information regarding their performance flow back to a central point to allow management of the population of radios.

According to another aspect of a preferred embodiment of the invention, network information is transmitted throughout the entire radio network using an addressing scheme that includes the physical address or an Internet Protocol address. Accordingly, management of the network may be accomplished from a centralized location with only a single or a few points of presence on the network. Moreover, various ones of the network elements may intercommunicate, such as shown and described in the above referenced patent application entitled "System and Method of Controlling Co-Channel Interference in Point to Point Communications", the disclosure of which is incorporated herein by reference.

Another object of a preferred embodiment of the invention is to provide a high efficiency and fiber-like quality of service (QoS).

Another object of a preferred embodiment of the invention is to provide a system that can support two-way integrated voice, data, and/or video services over one network architecture with no substantial changes necessary to add new services.

Another object of a preferred embodiment of the invention is to provide an information communication service, such as telephony or data communication services via an ISP, where customers are charged according to the bandwidth actually used and rather than the traditional access rates and tolls.

Another object of a preferred embodiment of the invention is to provide a robust network by providing multiple radio units, duplicate activity collection systems, ISP and points of presence (POPs) may be provided.

According to another aspect of a preferred embodiment of the invention, a microwave data network provides information communication services via point-to-point type and possibly point-to-multipoint type technologies. However, as such a network is envisioned to employ a large population of radio links, with each preferably separately controllable, the population of radios is managed by using a control message routing system utilizing logical and/or physical address of the radios.

According to another aspect of a preferred embodiment of the invention, a microwave data network provides intelligent radio units that can collect, store and transmit data regarding the network and network subscribers. According to another aspect of a preferred embodiment of the invention, an intelligent router or other network element is utilized to identify network subscribers or their associated information communications in order to track the actual bandwidth usage by subscriber to provide information that may be used for network utilization management, allocation, and/or billing of the subscriber.

According to another aspect of a preferred embodiment of the invention, a routing directory that contains the logical and/or physical address for addressable network devices, such as routers located in the wireless network or subscriber equipment coupled to the network, which can be updated to incorporate new addresses and new features that may be down loaded without interrupting network services, such as via a control overhead channel. Such information may be utilized according to the present invention for a number of purposes, such as determining the network resources required for transmission of particular data packets, determining an alternate communication path in case of a fault or to avoid a particularly congested link or portion of the network in transmitting a data packet, etc.

According to another aspect of a preferred embodiment of the invention, a centralized network operations center is coupled to the data network that can manage the complete universe of network radios and/or provide other network services, such as a billing service that is based of the actual amount of bandwidth used by a customer.

According to one aspect of a preferred embodiment of the invention, a data network spans a plurality of nodes with point-to-point type radio link connections adapted to provide networking features of the present invention. The network includes microwave radio stations located at respective nodes, each microwave radio station in radio communication with one or more other microwave radio stations for communicating data between the stations. Also located at each node is a data interface device connected to receive data from the associated microwave radio station. The data interface selectively routes data addressed to the node to the node. Data not addressed to the particular node is combined with data originating at the node and provided to the microwave radio station for transmission to a subsequent node.

According to a feature of a preferred embodiment of the invention, the data interface devices are responsive to a network control channel which is combined with payload data to form the combined data signal using time division multiplexing so that the combined data signal originating at each node is transmitted at the maximum peak data rate of the corresponding microwave radio station.

According to a still further feature of the invention, each of the microwave radio station is in bidirectional communication to support two-way radio communication with a network adjacent microwave radio station for both receiving data from and transmitting data to the respective other microwave radio station. Each of the microwave radio stations may additionally be in radio communication with a previous microwave radio stations for receiving data through the network and in radio communication with a next one of the microwave radio stations for transmitting data through the network. This architecture may further include a network ring topology.

According to another feature of a preferred embodiment of the invention, one of the nodes is a hub of the data network, with other nodes being in radio communication with the hub for transferring data among the nodes.

According to another feature of a preferred embodiment of the invention, one or more of the nodes includes a point-to-multipoint type radio station thereby maintaining radio communication with a plurality of remote nodes.

According to another feature of a preferred embodiment of the invention, one of the nodes may be connected to a remote or second network and to route data between the remote network and the nodes of the subject network.

According to another feature of a preferred embodiment of the invention, the nodes may include a data switch associated with the microwave radio station. The switch responds to address information contained in the received data to selectively route data, thereby providing the node with data addressed to the node. Data not addressed to the node may be processed for retransmission, such as by first combining it with data originating at the node to form the combined data signal.

According to another feature of a preferred embodiment of the invention, the microwave radio stations and data interface devices are mounted together in a common outdoor protective enclosure to thereby simplify instruction and installation.

According to another feature of a preferred embodiment of the invention, the data interfaces are mounted proximate to a directional microwave antenna of each radio station.

According to another aspect of a preferred embodiment of the invention, a network spans a plurality of nodes with radio link connections, ones of the nodes including a terminal device, microwave radio station and data interface device. Each of the microwave radio stations is in radio communication with another for communicating data between the respective nodes. The data interface device is connected to the microwave radio station and operates to forward data (i) to the node terminal or (ii) through and from the node to another node. Thus, the data interface selectively (i) provides portions of the received data to the terminal device and (ii) combines other portions of the received data with data provided by the terminal device to form a combined data signal and provide the combined data signal to the microwave radio station for transmission to another one of the nodes.

According to features of the invention, the terminal may be a computer or telephony equipment or other information communication device, including a network system such as a LAN, which may benefit from network information communications.

According to an aspect of a preferred embodiment of the invention, a method of communicating data between a plurality of network nodes includes substantially four steps. The method provides destination address information corresponding to one of the nodes, modulates a microwave signal with the data and transmits the microwave signal to an intermediate node of the network. The intermediate node receives the microwave signal and, in response to the address information, selectively (i) supplies the data to a terminal, or (ii) forwards the data to another one of the nodes. According to a feature of the method, the message is repeatedly forwarded through nodes of the network until it arrives the node corresponding to the destination address information.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWING

For a more complete understanding of the present invention, and the advantages thereof, reference is now made to the following descriptions taken in conjunction with the accompanying drawing, in which.

DETAILED DESCRIPTION

The present invention is a wireless network designed to deliver information, such as consistent with the typical telephony and data services, from a service provider, such as an ISP or LEC, and/or as between subscriber systems to metropolitan commercial customer locations. The network of the preferred embodiment present invention incorporates all system components necessary to connect customers, application equipment (e.g., phones, PBX's, computers, etc.) to the service provider's equipment, (e.g., C.O. switch, Tandem switch, point of presence (POP) gateway, ISP server, etc.) or other subscriber's system equipment (e.g., phones, PBXs, computers, etc.). The present invention integrates all the various functional tasks at the component level, to build a comprehensive, cohesive network solution. This is in clear contrast to other architectures which use a systems integration approach, which often entails communication equipment from one vendor interfacing with mux equipment from another, along with network management equipment from a third vendor and so forth. Integration at the component level is intended to provide a much higher degree of coordination and cohesion between network entities than has been achievable with networks that rely on the integration at the system level.

The network architecture of the present invention includes a distributed set of non-hierarchal nodes, connected together via wireless links. Although communication via wireless links is known, the present invention provides a network's solution providing high bandwidth information communication over a large area, such as a metropolitan area, which includes the use of cooperating wireless links, preferably manageable through a centralized controller with in band signaling. Accordingly, nodes of the network can act both as termination points (i.e., connecting to the customer's or service provider's equipment) and/or as tandems, (i.e., routing traffic on to other nodes). Links between nodes can be point-to-point type or point-to-multipoint type links. Note that the architecture can support any topology, including star and linear, as well as ring and mesh configurations. This allows for significantly increased network resilience with alternate path routing providing for both link and node redundancy with geographic diversity.

Figure 1:
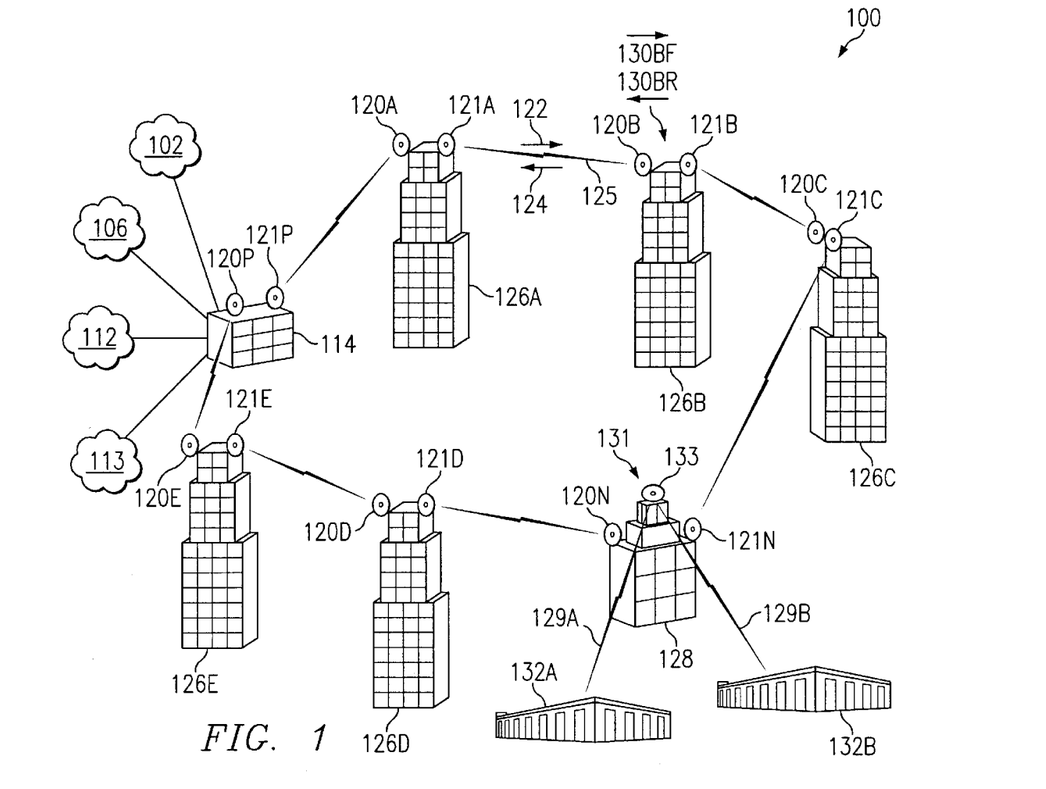
FIG. 1 illustrates the network of the present invention.

As shown in FIG. 1, Network 100 includes, by way of example, six primary nodes forming a bidirectional ring including a point of presence (POP) node 114 and subscriber/customer nodes 126A–126E and 128. The POP node 114 provides a gateway to access a service provider, such as an Internet service provider (ISP) 102, a telco 106, or management nodes 112 and 113, such as activity collection system (ACS) node or other management collection unit, and is connected to the customer nodes 126A–126E and 128 via point-to-point type microwave paths 125 forming the bidirectional ring. Subscriber nodes 132A and 132B are connected to the ring by respective point-to-multipoint type connections 129A and 129B emanating from subscriber node 128. Nodes forming the ring (i.e., POP node 114 and subscriber nodes 126A-126E and 128) each include respective transceiver units 120 (120A–E, N, and P) and 121 (121A–E, N, and P) for receiving microwave signals from, and transmitting to adjacent nodes of the ring so that data flows in both directions 122 and 124 around the ring. For example, subscriber node 126B includes a transceiver 120B positioned to receive a microwave signal from a transceiver 121A of node 126A. Data received from node 126A, which is not addressed to 126B, is forwarded directly or is combined with data originating at node 126B and forwarded, via link 13 OBF, for transmission by transceiver 121B to transceiver 120C of node 126C, which is the next node in the ring along the same direction. Alternatively, data received from node 126A which is addressed to node 126B is recognized and provided to subscriber equipment located at node 126B. Conversely, data received by transceiver 121B from next node 126C is examined and selectively forwarded to subscriber equipment located at node 126B or to transceiver 120B vialing 130Br to be transmitted, directly or together with data originating at node 126B, to prior node 126A. For example, data originating at a particular node on the ring may be combined with data received at the transceiver of the node but not directed to that node for transmission to the next node on the ring. Such originated data may be all initially routed to a common point, such as POP 114, for subsequent routing, possibly including determination of a best path, to a desired destination, such as another node on the ring or other point in communication with the common point. Alternatively, this originated data may be directly routed to the intended node.

Each origination node may simultaneously transmit data in both directions around the ring to provide redundancy for critical data or may reverse the direction of transmission to communicate with a particular node of the network when a more direct path is experiencing a fault or excessive communication traffic. Moreover, additional transceivers may be provided to alter the path of the transmission. For example, as more subscribers desire communication via the network, additional subscriber nodes may be deployed to link buildings or other locations not originally served by the network. These new links may be interjected between nodes of an existing link, such as between nodes 126A and 126B to thereby define a second link or "hop" between these two nodes. Additionally, or alternatively, such a new node may bridge a link between two more distant network nodes (nodes which are separated by a number of network links or "hops", such as nodes 126B and 126E) to thereby provide an alternate signal path in the network (i.e., split the ring into two rings) in addition to providing network services to this new node. Accordingly, these additional radios can create a robust network by rerouting data transmission traffic due to node failures, a customer priority, or timing/performance requirements. The number of required hops between particular nodes may also be reduced by the additional radios providing a new network path.

Network 100 may also provide data to individuals that are not part of the primary network signal path such as the preferred embodiment ring. For example, data transmitted from service provider node 106, such as the ISP, having a destination address located within subscriber node 132A may travel through nodes 126D, 126E, and 128, as described above, until it reached the transceiver at node 131. Alternately, the data may have been transmitted using nodes 126A, 126B and 126C. Within node 131, the switch analyzes the data and determines that the data needs to be forwarded to node 132A. The switch will route the information via a link (not shown) to the transceiver 131, which may, for example, have an omnidirectional antenna for transmitting the signal to subscriber 129A via a point-to-multipoint type path.

Figure 6:
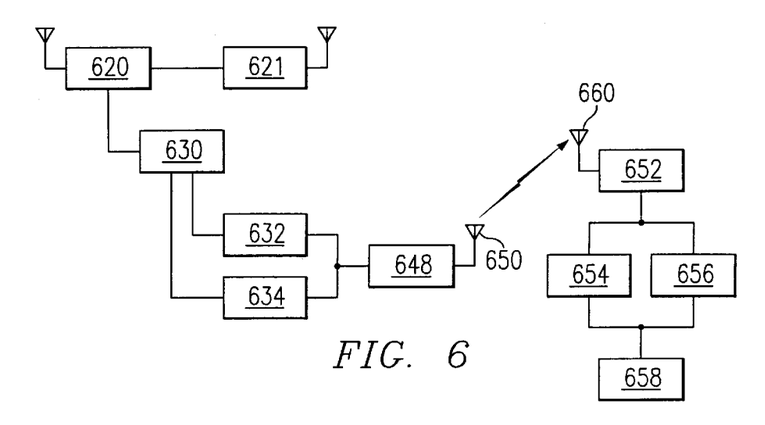
FIG. 6 illustrates a block diagram of point-to-multipoint circuits.

Similarly, as FIG. 6 illustrates, a transceiver, such as transceiver 620 or 621, may be modified to have or utilize a cable modem termination system CMTS (630) or other multipoint communication link. The CMTS is connected to an up converter (632), which mixes the signal with the carrier frequency for transmission of the signal, and down converter (634), which demodulate the received signal. The converters are coupled to a transmitter/receiver (648) which is coupled to an antenna (650) for transmitting the signal to a subscriber. The signal is received by a subscriber's antenna (660) which is coupled to a second transmitter/receiver for receiving the transmitted signal. The second transmitter/receiver (652) is connected to a second up converter (654), which mixes the signal with the carrier frequency for transmission of the signal, and second down converter (656), which demodulate the received signal. The received signal is transmitted to a cable modem (658). By deploying transceiver 652 in a multiuser system, such as a television cable system, a number of cable modems 658 may be coupled to the network of the present invention.

By utilizing techniques of placing a plurality of subscriber nodes in communication with the primary network path, economies of deployment may be realized. For example, the subscriber nodes which are deployed in the primary network path, such as nodes 126A–126E may provide network services into a commercial building, such as a high-rise office tower, where a subscriber or subscribers are located which need a relatively large amount of information communication capacity at a high bandwidth. The cost of the radio units and attendant equipment may easily be justified for their use as compared to the costs/benefits of traditional communications links such as T1 or ISDN lines. Moreover, as additional such subscribers desire the network services, additional subscriber nodes may be deployed, as described above, which take advantage of the network nodes already in place in order to be placed in communications with more distant systems, such as a service provider, without realizing the full cost of such a distant link. However, less demanding users, although still desirous of high bandwidth communications for burst type information communications, may not be able to justify the full cost of a subscriber node. Accordingly, point-to-multipoint type links, as described above, may be utilized to provide high bandwidth information communications to such users although capacity, because the bandwidth which is available is shared among the multipoint subscribers, will be diminished. Additionally, there may be users which desire high bandwidth information communication but which cannot justify even the shared costs of a point-to-multipoint type link. These users can benefit from the above more traditional type link provided by cable modem or other such link. Accordingly, a very inexpensive, and often already deployed, communication system may be leveraged to provide a gateway into the network system of the present invention.

Figure 2:
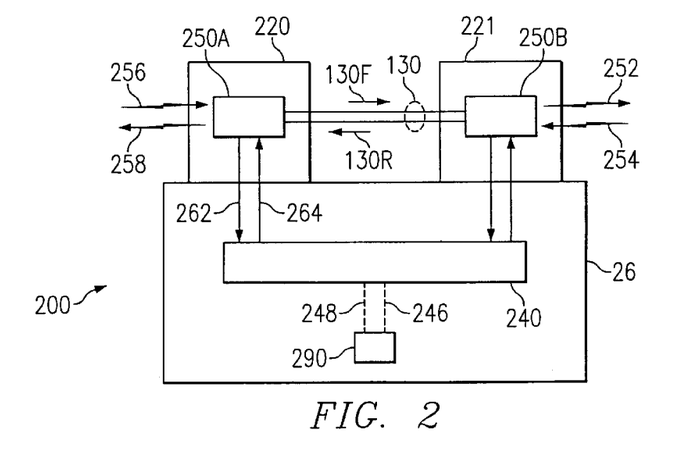
FIG. 2 illustrates a cross section of a node of the network of the present invention.

Referring to FIG. 2, a cross section of a node, transceiver 220 and 221 receive data from an adjacent node thought the wireless link 256 and 254, respectively, and transmits data to an adjacent node by the wireless link 258 and 252, respectively. Transceivers 220 and 221 are preferably coupled by a fiber optic, or other high bandwidth, cable such as link 130 providing full duplex in directions 130F and 130R. Of course, separate duplex cables or other links may also be provided, if desired. For example, a network management cable may be provided between transceivers 220 and 221 to communicate network control information, such as may be demultiplexed from a signal receiver at wireless links 252 or 258, generated by a controller or other intelligence coupled to the transceivers or is otherwise provided to the transceivers, then between. An intelligent switch or a router 240 connected to each transceiver 220 and 221 via preferably optical fiber or other high bandwidth, cables such as cables 262 and 264. Although a single router 240 is illustrated coupled to transceivers 220 and 221, it shall be appreciated that no such limitation exists in the present invention. For example, a plurality of routers may be utilized, such as a router coupled to node 220 and a separate router coupled to node 221. Of course, such as where a single piece of subscriber equipment utilizes the information directed to 26, router 240 may be omitted as described below with respect to FIG. 3, if desired. Such a configuration may be used at a first node, such as node 220, and a router or other multiple termination point system utilized as another node, such as node 221, within a same building.

When data is received from 256 for example, a switch 250A, within the transmitter 220, analyzes and determines the destination address of the data. If the address is not located within 26, the data is preferably forwarded directly or is combined with data originating at node 26 and forwarded, via link 130F, for transmission by transceiver 221 to the next adjacent node. If the address is located within 26, the data is sent into the building via cable 262 to the router 240, which transmits the data to customer device 290 via links 248 and/or 246.

Figure 3:
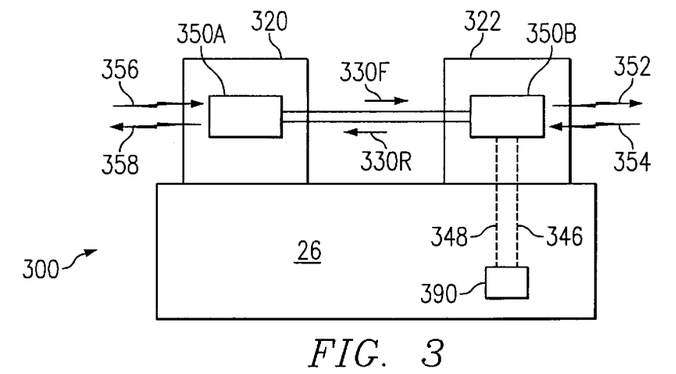
FIG. 3 illustrates another embodiment of the invention.

Reference is now made to FIG. 3, which illustrate a cross-sectional view of another embodiment of a node, here node 300. A first transceiver unit 322 is coupled directly to customer 390 via links 348 and 346 and a second transceiver unit 320 via links 330F and 350R. This customer may receive the entire data stream, such as a 100 Mbps signal that is being transmitted by the transceiver directed to this location.

With the configuration of the present invention, the only data that is required to travel within the building is the incoming data addressed for use at this node, or the data sourced at this node for transmission to other nodes. All the remaining data traffic may be examined for the destination address, or other indicium of data destination or information suitable for determining data destination, by the switch located in the transceiver and directed to a proper destination without the need for the data to be brought down into the building. Thus any failures in the link might isolate a subscriber unit from the network, but will not interfere with any other network functions.

The transceiver units 120 and 122 may be IFUs (Invisible Fiber Unit), which is an external subsystem having an antenna, transceiver capabilities, and a switching module. The units are preferably mounted on the customer premises building roof typically at the roof edge or on a wall. The IFU could also be mounted to a nearby tower. The IFU units may be placed from a few feet (e.g., a building next door) to miles apart. For this example, they are evenly staggered approximately two miles apart, as such a deployment has been found to provide coverage to most appropriately sized potential subscribers in a typical urban sprawl area, such as that of the area of California U.S.A. known as "Silicon Valley". There is no requirement the IFU units be evenly spaced. In addition, IFU units can be easily added, by installing a new IFU and redirecting antennas of two existing IFUs to communicate with the antenna of new IFU, or deleted between existing hops, by redirecting the antenna of the adjacent IFUs to another path. This is a significant improvement over the prior wire and fiber networks, which are difficult to reconfigure due to the required permitting, right-of-way resolution, digging etc., associated with placing a new cable media in the ground or deploying aerial cables.

The radio units that are mounted on the same building are preferably connected by a bidirectional link, such as fiber optic link 130. The IFUs may be coupled by a radio link.

In a preferred embodiment, the IFU is capable of providing full or half duplex communications via a wireless bidirectional, preferably 200 Mbps, link 125 between the two units (i.e., 100 Mbps travels in a clockwise direction 130F and another 100 Mbps travels in a counterclockwise direction 130R), which is controlled by a switch, preferably an Ethernet switch where 100 Mbps Ethernet is used. The bidirectional link provides a redundancy feature to the network, which allows traffic to be rerouted.

The IFU of the preferred embodiment operates reliably over a wide temperature range, in all weather conditions. For example, the preferred embodiment IFUs include the use of a control channel and feedback in order to determine the effects of environmental conditions on the received signal, as shown in the above referenced patent application entitled "System and Method of Controlling Co-Channel Interference in Point to Point Communication". Moreover, the IFUs of the preferred embodiment are designed to be easy to install and align, with total IFU installation taking less than an hour. For example, the preferred embodiment IFUs are adapted for simplified installation, alignment, and replacement as shown and described in the above referenced concurrently filed patent applications entitled "METHOD AND APPARATUS FOR RADIO INSTALLATION AND ALIGNMENT", "SELF BALANCING BRACKET FOR RADIO TRANSCEIVER", and "APPARATUS AND METHOD FOR LOCAL RADIO MANAGEMENT AND CONTROL USING AUTOMATED CUSTOMER INTERFACE".

Additionally, or alternatively, multiple pairs of IFUs can be deployed to provide redundancy or alternate path routing to provide high network availability and resilience. In another embodiment, one IFU may have two directional antennas pointed at different adjacent IFU, with each antenna coupled to a transceiver. In another embodiment, a more traditional indoor unit IDU and outdoor ODU similar to that of a traditional point-point system, may be implemented with fibre like link reliability.

In the preferred embodiment, IFU is a relatively high power transceiver, operating on the order of 2 Watts as opposed to the 50 milliwatts common in typical point-to-point systems. Accordingly, the preferred embodiment radio unit is adapted to support higher bandwidth communications at greater distances.

In the preferred embodiment, is a switch 250A is located within the IFU, preferably an Ethernet switch, which is an intelligent switch that learns by creating tables that reference the destination addresses. The switch is a store and forward device. The switch determines whether the data is intended for a subscriber device located within that building or whether the data needs to be transmitted to the next address. For a data destination not located within the building, the information is transmitted via the data port through link 130 to the second radio located on the building for transmission to the next hop. If the destination address is associated with a subscriber within the building switches 250A or 250B direct the data to router 240.

In a preferred embodiment, the switch router 240 is a layer 3 device, such as an Internet Protocol device. In particular deployment environments such a device will be a part of the network and therefore be outside of the subscribers purview. However, for another embodiment such a router may be provided by a subscriber to provide network information communications to a plurality of affiliated subscriber systems, such as those of a subscriber LAN. In another embodiment, the router may be collocated with the IFU, thereby providing a plurality of subscriber connections into the building.

The router 240 receives data from the IFUs 220 and 221 through connections 262, 264, 266 and 268. These connections may be a single cable such as using optical fiber, or multiple cables capable of carrying the necessary traffic which in the preferred embodiment is data rates of 100 Mbps.

The router may have as many ports as there are customers in the building; having a port for each customer allows the router to see the customer as an individual. Multiple routers may be deployed to increase capacity and redundancy or alternate path routing to provide high network availability and resilience. Based on the port used during a transmission the router or other network elements, the IFU of the preferred embodiment may record how many bps were utilized or other measure of actual network utilization in a data base identifying this information with a particular subscriber, subscriber unit or other identification information. This allows the customer to be charged for only the amount of bandwidth that the customer used and not the bandwidth that was available, although not fully utilized. This is a great advancement over a typical T1 line installation where a subscriber must buy the link regardless of how much data is actually transmitted. Likewise, this is a great advancement over a shared or multiplexed T1 installation where multiple subscribers may share the bandwidth among many customers without any way of identifying or recording a customer utilization for billing purposes. Preferably, the IFUs, or other higher order network element, will interrogate the network elements storing subscriber use information for information regarding the data used by the ports (i.e., the customers) and may store the information locally or transmit it back to a activity collection unit.

Preferably, the router contains a routing information table, which contains information, such as, network number, routes to a particular destination, and metrics associated with those routes. Some of this information may be derived through recording a particular port a data packet originated from a particular piece of equipment was received upon. However, others of this information, such as network communication matrix information, i.e., which network elements are in communication with which other network elements, may be advantageously provided from an intelligent source, as will be further appreciated from the discussion below.

Preferably, the router or other intelligent switching apparatus of network elements is used to determine the best possible route to forward packets to a destination. As more network rings are connected the job of the router become more important. Preferably, these devices providing router functionality will be updated with routing information about the network, the network elements in communication therewith, and the information systems and/or services it can reach and the cost or the number of hop counts. The router will, at a first level, determine the destination route on the basis of the fewest hop counts need to reach the destination. However, these determinations may be adjusted according to dynamic conditions, such as the failure of a link or localized network traffic, in order to provide an improved path although involving more hops. As changes occur to the network, such as topology changes, a new route destination may be prove to be more cost efficient. Thus routing tables are preferably constantly or periodically updated. Moreover, as a communication route is preferably provided to these network elements to accomplish the above mentioned routing information updates, this link may be leveraged to provide additional features and functionality. For example, additional features may be added physically or downloaded to the router within seconds without interrupting the customer.

For a wireless SONET ring a routing table is generally not necessary, because it will send data simultaneously in two directions. Sending one data packet in two directions provides redundancy for the SONET ring. However, where subscribers are coupled to the network outside the primary network path, such as with the above described multipoint systems, routing may become necessary. Accordingly, termination equipment, such as an add/drop multiplexer (ADM) may be utilized at these points in order to route the appropriate data accordingly.

The point of presence connection (POP) is a gateway to external networks, such as the Internet via an ISP's server. The POP may also be the repository for all network configuration information, etc. In addition, the POP may have an Activity Collection System (ACS) located within the POP or remote from the POP, for collecting billing information (e.g., customer, usage, priority given during transmission) and network status information (e.g., the traffic levels of the network). Of course, an ACS may be deployed external to a POP, such as within a network operations control center utilized in maintaining and operating the radio links of the network, if desired.

A point of presence connection external network interface can be deployed anywhere in the system where external network connections are required, so a typical network may have multiple point of presence connections, strategically placed within the service area. In addition, the point of presence network configuration and control functions can also be geographically replicated as desired to provide improved network resilience.

In operation, the POP transmits an Ethernet packet with a data element that represents the physical address of the destination device, such as a MAC address, to the first IFU hop. As described above, the IFU will analyze the address information and forward the data accordingly. However, it should be appreciated that in the preferred embodiment the IFUs only analyze the routing information of the data transport packet and not the information payload data.

Preferably, Activity Collection System (ACS) collects data that the IFUs have interrogate from the IP devices (switch/router). This data includes information such as the customer name and information sufficient to identify the customer, how many bps of data the customer has transmitted or received or other measurement of network utilization, and possibly even the status of the network. This module can provide billing or invoicing features. With the information collected by the ACS, a network service provider may bill a customer for the amount of network communication services utilized or the Quality of Service (QOS) that was received, such as priority connection or routing when the network is busy.

Every active device (IFU, POP, Ethernet switch or IP router) in a deployed network preferably has its own physical address (i.e., MAC address), which is used to send network management information (status, configuration, alarms) between the active device and any OAM&P station currently logged into the device. In addition, each device is preferably enabled to allow distributed processing, allowing in to download and run applications such as program applets at will. This ability has great significance to the overall operational maintainability and profitability of the network, since it allows the operator to continuously update and upgrade device capabilities remotely over the entire lifetime of the network.

When a device, such as a router is first initialized or reset, it preferably first contacts a POP or other central control point to boot up and then to determine what software and/or firmware to download. For a cold start or newly installed device this is typically a diagnostics applet which checks out all the hardware functions for the device. Once completed, the central control point then downloads the device's configured personality, including all necessary application code, and parameters for the feature set required by the designated end user. This arrangement allows for all service parameters to be configured prior to installation of the device, thereby easing the logistics of service activation.

As an option, applets implementing SNMP proxy agent functionality for each device can also be deployed, which report back to network management positions such as HP Open View network management positions, thereby providing compatibility with SNMP-based legacy network management.

The customers, which need these telephony and data services, usually fall into one of four following categories: large business, medium business, small business and residential.

A large business can be considered to be a group greater than a thousand people, an ISP or a big server. This category usually requires large amounts of bandwidth, therefore, the large business typically buys or leases DS3, OC3 or OC12 lines at a cost ranging from $45K/month to $180K/month. A medium business may be a group of 10 to 30 people that usually buys or leases a T1 line from a telco at a cost of $1.5K/month. A small business can be consider to be 1 to 10 people or a small office that usually buys an ISDN or dial up connection a cost $100–$200/month. A residential customer is considered a home user or very small business user with a dial up modem or cable modem.

Figure 4:
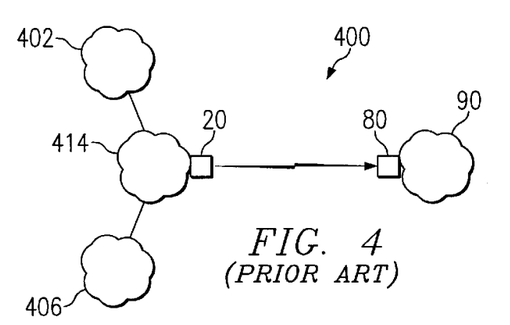
FIG. 4 illustrates a prior art solution.

FIG. 4 shows the prior art solution for providing telephone and data services to a large business or large customer. A large customer is connected to a central office (CO) 406 or an Internet Services Provider (ISP) 402 via a gate 414 that has a radio unit 20 for transmitting information to a radio unit 80 at the customers location 90. This figure only shows one hop, but there may be more than one hop where back-to-back point-to-point systems are deployed to span a larger distance.

With the present invention a large business or customer can receive telephony and data services via an ISP, or other service provider, through a point of presence connection that has a radio unit for transmitting information to a second radio unit. Accordingly, rather than a particular link being deployed for a single subscriber, economics may be realized in that multiple hops may be made to bring multiple subscribers onto the network. Therefore, a data destination not located within a particular building of a hop may be transmitted via a second radio located on the building for transmission to the next hop. If the destination address is associated with a subscriber within the building, the switch can coupled directly to customer's communications equipment to receive the full bandwidth of the communication link, such as an entire 100 Mbps signal, that is being transmitted by the ISP. Accordingly, the subscriber receives the large bandwidth as needed and makes available this bandwidth for other subscribers when not needed.

Figure 5:
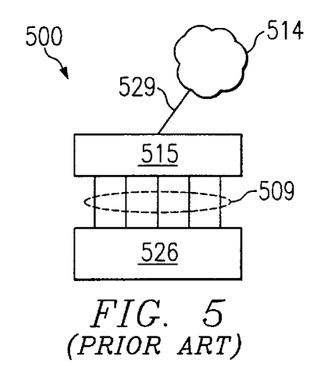
FIG. 5 illustrates a prior art solution.

FIG. 5 shows the prior art solution for providing telephone and data services to a medium size business or customer. A medium customer or customers 526 is connected to a central office (CO) 515, such as via 1.544 Mbps T1 line connections 509. The central office generally uses a connection of the T1 lines to communicate signals to and from all of these T1 lines to an ISP or other service provider through point of presence connection 529, itself generally one or reduced number of T1 lines. Accordingly, the customer is then connected to an Internet Services Provider (ISP) 514 via the point of presence connection 529 which is usually a single T1 line. Drawbacks to this solution include the customers sharing the bandwidth between the central office and the point of presence 529 and thus not receiving their paid for Ti throughput. Moreover, the customers are paying for a particular level of connection which may be utilized only partially. This forces a trade off in that the customer is probably unable to afford the actual bandwidth utilized for bursts of information and must accept a next highest constant bandwidth that is cost effective and provides tolerable communication speeds. In the above example of T1 lines, even ignoring the bottle neck associated with the ISP's limited number of corrections to the CO, the customer will only have 1 Mbps available to him at any time which may be significantly slower than the user equipment native data rate, such as if a 100 Mbps user network is involved.

As shown in FIG. 1, The present invention may provide a medium business or customer with telephony and data services via ISP 102 or other service provider through point of presence connection 114 that has transceivers 120P and 121P. The transceivers routes information to customers located with the buildings 126A–126E and 128 by wireless point-to-point connection 125, similar to the example above.

The present invention may provide a small business or customer with telephony and data services via ISP 102 though point of presence connection 114 employing point-to-point and point-multipoint technology. Small business do not generate the revenue to justify the capital expense require to deploy a pair of IFUs, however, there may be several other small businesses location within the same area that need or desire these services. In this practical application the IFU is modified to transmit signals on an omnidirectional, multidirectional, or broad band antenna to specified subscriber receivers operating at several different locations. This method ties the small business into the wireless network at a fraction of the cost of deploying a pair of IFUs at each small business.

The present invention can be deployed as an application solution for at least three distinct scenarios. The first scenario is for providing local telephony service access. In this application the system is used to provide the connectivity between subscribers and the service provider's Central Office switch; essentially the system can be viewed as a "wireless fiber" OSP network. The system can connect to the C.O. switch directly at the Central Office Main Distribution Frame, or indirectly by connection to optical fiber Access Nodes. The CO switch may be responsible for all services provided, as well as ancillary function such as billing, provisioning, etc. Full data services are also supported in this configuration.

The second scenario is for providing a switchless network. In this application the system provides the service functionality including switching, provisioning, billing etc. Customers' calls are switched within the network backbone itself. The need for a separate CO switch is eliminated. This application may be particularly desirable for operators who have not deployed switching equipment in their target service area. Full data services are also supported in this configuration.

In the Switchless Network mode of operation, all call processing is handled entirely within the network. For a call between two users on the same network, the termination equipment connecting to each end user are responsible for detecting off-hook, providing dial-tone, performing number analysis, triggering ringing at the destination station, and finally building the audio path connection across the network links between the two users when the called party answers.

The third scenario is for providing computer system networking services. In this application, subscriber computer or other information systems are provided with a transparent link to a plurality of other systems. For example, various subscriber systems may be linked by the network to affiliated ones of the subscriber systems may be provided communications with outside service providers, such as the above mentioned ISPs or other systems not of the wireless network.

Although the above three scenarios have been discussed above separately, it shall be appreciated that the present invention may operate to provide information communication consistent with any or all simultaneously. This mixed use functionality is possible due to the network components of the present invention being ambivalent to the use payload data and only concerning themselves with routing or other network overhead data in order to provide the desired communications.

It shall be appreciated that, although a preferred embodiment of the present invention has been described above with reference to the use of transceivers, communication equipment other than that generally referred to as transceivers may be used. For example, radio receivers and transmitters may be deployed at the nodes of the network, such as where communication in one direction around a network ring topology is desired or where a discrete receiver and transmitter pair is desired rather than a transceiver unit.

Additionally, it shall be appreciated that, although microwave communication has been described with reference to a preferred embodiment, there is no limitation of the present invention to a particular form of communications. For example, a preferred embodiment of the present invention utilizes millimeter wave technology for providing communications. However, provided that communications may be established with sufficient distance, reliability, and bandwidth, the present invention may rely upon the use of spectrum outside that of the microwave spectrum, including even various unlicensed bands, if desired.

Although the present invention and its advantages have been described in detail, it should be understood that various changes, substitutions and alterations can be made herein without departing from the spirit and scope of the invention as defined by the appended claims.

What is claimed is:

1. An urban area information network system comprising:
   a plurality of data interfaces coupling termination equipment to said network system, wherein each interface of said plurality of data interfaces includes a first, second, and third port operational under control of control logic to selectively provide portions of data presented at one of said first, second, and third ports to a selected different one of said first, second, and third ports; and
   a plurality of wireless communication links each having a first end coupled to a data interface of said plurality of interfaces and a second end coupled to a data interface of said plurality of interfaces and providing at least 100 megabit per second information communication between said first and second ends, wherein said links are disposed in said urban area to allow information communicated over a one link of said plurality of links to be subsequently communicated over another link of said plurality of links thereby providing information communication over a distance larger than any single link of said plurality of links.

2. The system of claim 1, wherein selective provision of portions of data presented at said one of said first, second, and third ports to a different one of said first, second, and third ports is at least in part determined by address information associated with said portions of data.

3. The system of claim 2, wherein said address information is an unique address of termination equipment coupled to said network through said one of said first, second, and third ports said portion of data is selectively provided.

4. The system of claim 3, wherein said unique address is a physical address of said termination equipment.

5. The system of claim 3, wherein said unique address is a logical address of said termination equipment.

6. The system of claim 3, wherein said unique address is an Internet protocol address.

7. The system of claim 1, wherein said control logic is adapted to operate an associated said data interface to combine portions of data presented to said first port with data presented to said second port to form a combined data signal and present the combined data signal to said third port.

8. The system of claim 1, wherein interfaces of said plurality of data interfaces also include a forth port, and wherein operation of said control logic selectively provides portions of data present at one of said first, second, and third ports to said forth port.

9. The system of claim 1, wherein said wireless communication links of said plurality of wireless communication links are established utilizing microwave radio communication equipment.

10. The system of claim 9, wherein said microwave radio communication equipment comprise radio transceivers operating in the 38 GHz spectrum of frequencies.

11. The system of claim 9, wherein said microwave radio communication equipment provides reliable data grade information communication links of approximately 1.5 miles each.

12. The system of claim 1, wherein a second end of a link of said plurality of links is in time division multiple access communication with a plurality of pieces of termination equipment.

13. The system of claim 12, wherein said time division multiple access communication is provided by wireless links of a point-to-multipoint radio communication system.

14. The system of claim 12, wherein said time division multiple access communication is provided by a cable modem communication system.

15. The system of claim 1, wherein said at least 100 megabit per second information communication comprises a 100 megabit per second Ethernet data packet.

16. The system of claim 1, wherein said at least 100 megabit per second information communication comprises a SONET data stream.

17. The system of claim 1, wherein said disposition of said links in said urban area forms a ring network topology.

18. The system of claim 17, wherein said ring network topology comprises multiple coupled network rings of said links.

19. An urban area information network system comprising:
   a plurality of data interfaces coupling termination equipment to said network system; and
   a plurality of wireless communication links each having:
      a first end coupled to a data interface of said plurality of interfaces; and
      a second end coupled to a data interface of said plurality of interfaces, wherein each interface of said plurality of data interfaces includes a first, second, and third port operational under control of control logic to selectively provide portions of data presented at one of said first, second, and third ports to a selected different one of said first, second, and third ports, and wherein said control logic is adapted to operate an associated said data interface to combine portions of data presented to said first port with data presented to said second port to form a combined data signal and present the combined data signal to said third port; and
      providing at least 100 megabit per second information communication between said first and second ends, wherein said links are disposed in said urban area to allow information communicated over a one link of said plurality of links to be subsequently communicated over another link of said plurality of links thereby providing information communication over a distance larger than any single link of said plurality of links; and
   wherein a data signal is provided to said one of said first, second, and third ports including a data frame having a predefined wireless network overhead portion and a payload portion, wherein said wireless network overhead portion of said data signal is provided exclusively to said forth port.

20. The system of claim 19, wherein said payload portion comprises a 100 megabit per second Ethernet data packet.

21. The system of claim 19, wherein said payload portion comprises data formatted according to the SONET protocol.

22. The system of claim 19, wherein said wireless network overhead portion comprises wireless link control instructions.

23. The system of claim 19, wherein said wireless network overhead portion comprises wireless link interrogation requests.

* * * * *